United States Patent
Sasaki

(10) Patent No.: US 11,326,531 B2
(45) Date of Patent: May 10, 2022

(54) EVAPORATIVE FUEL PROCESSING DEVICE

(71) Applicant: DENSO CORPORATION, Kariya (JP)

(72) Inventor: Ryota Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/186,501

(22) Filed: Feb. 26, 2021

(65) Prior Publication Data
US 2021/0180530 A1 Jun. 17, 2021

Related U.S. Application Data

(63) Continuation of application No. PCT/JP2019/033671, filed on Aug. 28, 2019.

(30) Foreign Application Priority Data

Aug. 29, 2018 (JP) .............................. JP2018-160891

(51) Int. Cl.
*F02M 33/02* (2006.01)
*F02D 41/00* (2006.01)
(Continued)

(52) U.S. Cl.
CPC ..... *F02D 41/0032* (2013.01); *B01D 53/0446* (2013.01); *B01D 53/0454* (2013.01);
(Continued)

(58) Field of Classification Search
CPC .... F02M 25/08; F02M 33/02; F02M 25/0836; F02D 19/0621; F02D 41/003;
(Continued)

(56) References Cited

U.S. PATENT DOCUMENTS 5,626,122 A * 5/1997 Azuma ................. F02M 25/08
123/685
5,836,291 A * 11/1998 Kinugasa ............ F02D 41/0032
123/679
(Continued)

FOREIGN PATENT DOCUMENTS

JP S60-047837 3/1985
JP H8-240138 9/1996
(Continued)

*Primary Examiner* — John Kwon
(74) *Attorney, Agent, or Firm* — Nixon & Vanderhye, P.C.

(57) ABSTRACT

A purge control unit opens the purge control valve to supply, as purge gas to an intake passage, the evaporative fuel together with air in response to a predetermined purge request. An air-fuel ratio detection unit detects an air-fuel ratio of the internal combustion engine. A concentration learning unit estimates a fuel concentration in the purge gas based on a change in the air-fuel ratio when the purge control unit causes the purge gas to be supplied to the intake passage and to perform a fuel concentration learning to update a concentration learning value, which is a learning value of the fuel concentration in the purge gas, based on the estimated fuel concentration. An injection control unit corrects a fuel injection amount based on the concentration learning value in a period in which the concentration learning unit performs the fuel concentration learning in the lean combustion operation.

16 Claims, 6 Drawing Sheets

(51) Int. Cl.
*B01D 53/04* (2006.01)
*F02D 41/14* (2006.01)
*F02M 25/08* (2006.01)
*F02M 35/10* (2006.01)

(52) U.S. Cl.
CPC ..... *F02D 41/0042* (2013.01); *F02D 41/0045* (2013.01); *F02D 41/1454* (2013.01); *F02M 25/0836* (2013.01); *F02M 25/0854* (2013.01); *F02M 35/10222* (2013.01); *B01D 2257/708* (2013.01); *B01D 2259/40086* (2013.01); *B01D 2259/4516* (2013.01)

(58) Field of Classification Search
CPC ............. F02D 41/0032; F02D 41/0037; F02D 41/004; F02D 41/0045
USPC ........................................ 123/518, 519, 520
See application file for complete search history.

(56) References Cited

U.S. PATENT DOCUMENTS

| | | |
|---|---|---|
| 5,979,419 A | 11/1999 | Toyoda |
| 2002/0139360 A1* | 10/2002 | Sato .................... F02D 41/0042 |
| | | 123/698 |
| 2011/0288739 A1 | 11/2011 | Kidokoro et al. |
| 2013/0096757 A1* | 4/2013 | Fukui .................... B60W 20/50 |
| | | 701/22 |

FOREIGN PATENT DOCUMENTS

| | | |
|---|---|---|
| JP | 2002-013437 | 1/2002 |
| JP | 2002-47987 | 2/2002 |
| JP | 2017-106371 | 6/2017 |
| JP | 2018-123767 | 8/2018 |

* cited by examiner

US 11,326,531 B2

EVAPORATIVE FUEL PROCESSING DEVICE

CROSS REFERENCE TO RELATED APPLICATION

The present application is a continuation application of International Patent Application No. PCT/JP2019/033671 filed on Aug. 28, 2019, which designated the U.S. and claims the benefit of priority from Japanese Patent Application No. 2018-160891 filed on Aug. 29, 2018. The entire disclosures of all of the above applications are incorporated herein by reference.

TECHNICAL FIELD

The present disclosure relates to an evaporative fuel processing device.

BACKGROUND

Conventionally, a known evaporative fuel processing device adsorbs evaporative fuel in a fuel tank temporarily on a canister and opens a purge control valve according to an engine operating state, thereby to supply the evaporative fuel adsorbed on the canister together with air into an intake system of an internal combustion engine for combustion processing.

SUMMARY

According to an aspect of the present disclosure, an evaporative fuel processing device is applicable to an internal combustion engine that is provided with a fuel injection valve and configured to perform lean combustion to burn an air-fuel mixture at an air-fuel ratio that is leaner than the stoichiometric air-fuel ratio. The evaporative fuel processing device is configured to cause evaporative fuel to be burned in the internal combustion engine by using an adsorption unit, which is configured to adsorb evaporative fuel in a fuel tank, and a purge control valve, which is provided in a purge passage that communicates an intake passage of the internal combustion engine with the adsorption unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
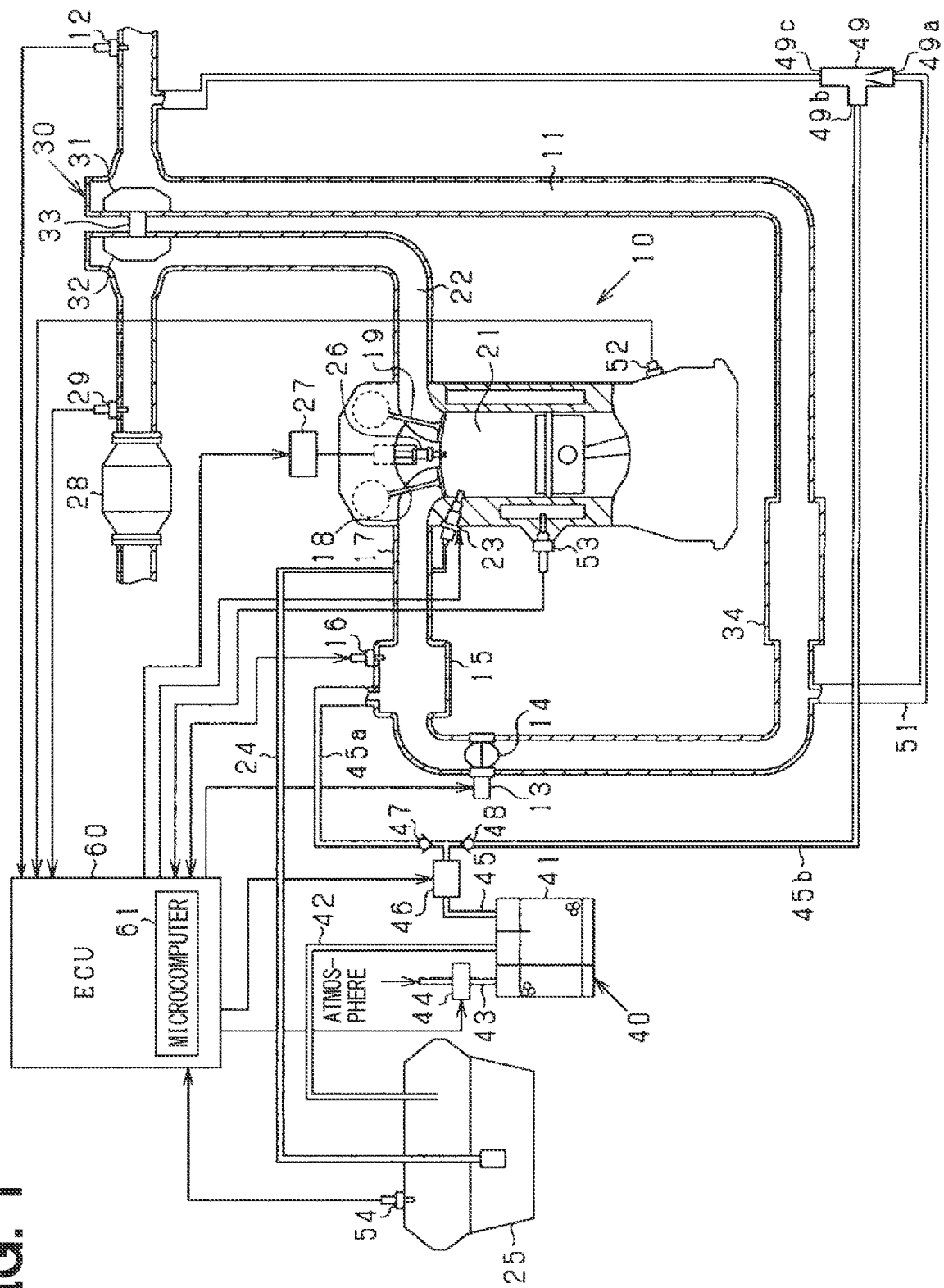
FIG. 1 is an overall schematic configuration diagram of an engine control system.

As follows, examples of the present disclosure will be described as follows.

According to an example of the present disclosure, an evaporative fuel processing device is configured to purge evaporative fuel, which is generated in a fuel tank, into an intake passage of an internal combustion engine and burn the evaporative fuel.

According to an example of the present disclosure, an evaporative fuel processing device adsorbs evaporative fuel in a fuel tank temporarily on a canister and opens a purge control valve according to an engine operating state, thereby to supply the evaporative fuel adsorbed on the canister together with air into an intake system of an internal combustion engine for combustion processing.

The evaporative fuel treatment system is configured to estimate a fuel concentration in purge gas and to perform correcting of a fuel injection amount according to the estimated fuel concentration and to perform an optimum air-fuel ratio control. In this example, a concentration value of fuel in purge gas is calculated as a concentration learning value by using the air-fuel ratio when purge gas is not introduced and by using the air-fuel ratio and a purge rate when purge gas is introduced without correction by performing a fuel injection amount correction. Subsequently, a fuel injection amount is corrected.

Assuming that the learning of the concentration value of fuel in the purge gas is completed and that a correction is started to reduce the fuel injection amount by using the fuel concentration in the purge gas, it is conceivable that a delay may arise before the correction of the fuel injection amount is appropriately made. In this case, a concern arises that a torque fluctuation and deterioration in emission may occur during the period in which the concentration value of fuel in the purge gas is estimated. In particular, in a case where the internal combustion engine performs lean combustion in order to improve a fuel efficiency, the air-fuel ratio is highly required to be properly controlled in order to sufficiently reduce NOx emissions, to suppress misfires, and to appropriately suppress torque fluctuations and deterioration in emissions.

According to an example of the present disclosure, an evaporative fuel processing device is applicable to an internal combustion engine that is provided with a fuel injection valve and configured to perform lean combustion to burn an air-fuel mixture at an air-fuel ratio that is leaner than the stoichiometric air-fuel ratio. The evaporative fuel processing device is configured to cause evaporative fuel to be burned in the internal combustion engine by using an adsorption unit, which is configured to adsorb evaporative fuel in a fuel tank, and a purge control valve, which is provided in a purge passage that communicates an intake passage of the internal combustion engine with the adsorption unit.

A first example includes: a purge control unit configured to open the purge control valve and to supply, as a purge gas to the intake passage, the evaporative fuel together with air in response to a predetermined purge request; an air-fuel ratio detection unit configured to detect an air-fuel ratio of the internal combustion engine; a concentration learning unit configured to estimate a fuel concentration in the purge gas based on a change in the air-fuel ratio detected by using the air-fuel ratio detection unit when the purge control unit causes the purge gas to be supplied to the intake passage and to perform a fuel concentration learning to update a concentration learning value, which is a learning value of the fuel concentration in the purge gas, based on the estimated fuel concentration; and an injection control unit configured to correct a fuel injection amount, by which fuel is to be injected from the fuel injection valve, based on the concentration learning value in a period in which the concentration learning unit performs the fuel concentration learning in the lean combustion operation and to cause the fuel injection valve to inject fuel by the corrected fuel injection amount.

This configuration performs correction of the fuel injection amount by using the concentration learning value in a period in which learning of the fuel concentration of the purge gas is performed in the operation of the internal combustion engine with the lean combustion. In other words, in a case where performing the learning of the fuel concentration of the purge gas in the lean combustion operation, the configuration performs the learning of the fuel concentration of the purge gas while correcting the injection amount according to the concentration learning value. This configuration enables to cause the fuel injection valve to inject fuel in consideration of an amount of fuel that is to be supplied to the intake passage by the evaporative gas purge, while performing the learning of the fuel concentration of the purge gas. In this way, when performing the fuel concentration learning of the purge gas in the lean combustion operation, the configuration enables to suppress the fluctuation of the air-fuel ratio due to the delay in the injection amount correction until the learning is completed.

According to an example of the present disclosure, an evaporative fuel processing device is applicable to an internal combustion engine that is provided with a fuel injection valve and configured to switch an operating state between a stoichiometric combustion operation, which is to burn air-fuel mixture at a stoichiometric air-fuel ratio, and a lean combustion operation, which is to burn air-fuel mixture at an air-fuel ratio on a lean side of a theoretical air-fuel ratio. The evaporative fuel processing device is configured to supply, as purge gas, evaporative fuel with air to an intake passage to cause the purge gas to be burned by using an adsorption unit, which is configured to adsorb evaporative fuel in a fuel tank, and a purge control valve, which is provided in the purge passage that communicates the intake passage of the internal combustion engine with the adsorption unit.

A second example includes: a purge control unit configured to open the purge control valve and to supply, as a purge gas to the intake passage, the evaporative fuel together with air in response to a predetermined purge request; an air-fuel ratio detection unit configured to detect an air-fuel ratio of the internal combustion engine; a concentration learning unit configured to estimate a fuel concentration in the purge gas based on a change in the air-fuel ratio detected by using the air-fuel ratio detection unit when the purge control unit causes the purge gas to be supplied to the intake passage and to perform a fuel concentration learning to update a concentration learning value, which is a learning value of the fuel concentration in the purge gas, based on the estimated fuel concentration; an operation control unit configured to switch the operating state of the internal combustion engine from the stoichiometric combustion operation to the lean combustion operation in response to a predetermined lean combustion request in the stoichiometric combustion; an injection amount learning unit configured to perform injection amount learning to correct a fuel injection amount, by which fuel is to be injected from the fuel injection valve, based on the deviation amount between the command injection amount for the fuel injection valve and the actual fuel injection amount; and an air-fuel ratio learning unit configured to acquire an air-fuel ratio deviation amount, which is a deviation amount between the target air-fuel ratio of the internal combustion engine and the detected air-fuel ratio detected by using the air-fuel ratio detection unit, in a state where the purge gas is not supplied to the intake passage and perform an air-fuel ratio learning to correct the detected air-fuel ratio. The operation control unit is configured to switch the operating state of the internal combustion engine from the stoichiometric combustion operation to the lean combustion operation, in response to the lean combustion request in the stoichiometric combustion operation, on condition that a learning history, in which the injection amount learning unit has performed the injection amount learning in the stoichiometric combustion operation, exists. The purge control unit is configured to open the purge control valve to supply the purge gas to the intake passage, in response to a purge request after the operation control unit has switched the operation state of the internal combustion engine from the stoichiometric combustion operation to the lean combustion operation, on condition that the air-fuel ratio learning unit has performed the air-fuel ratio learning after switching to the lean combustion operation. The concentration learning unit is configured to perform the fuel concentration learning after the air-fuel ratio learning unit has completed the air-fuel ratio learning and when the purge control unit supplies the purge gas to the intake passage.

This configuration permits switching from the stoichiometric combustion operation to the lean combustion operation on condition that a learning history of the fuel injection amount in the stoichiometric combustion operation exists. This configuration further eliminates the air-fuel ratio deviation between the target air-fuel ratio and the detected air-fuel ratio without performing the evaporative gas purge after switching to the lean combustion operation, and thereafter, performs the evaporative gas purge and learns the fuel concentration. In a case where a discrepancy arises between the command injection amount to the fuel injection amount and the actual injection amount, a concern arises that the deviation between the concentration learning value of the fuel concentration learning and the actual concentration cannot be detected accurately due to the deviation of the injection amount. Further, the detection accuracy of the air-fuel ratio detection unit in the lean combustion region is lower than that in the stoichiometric combustion region, and therefore, a concern arises that decrease in the detection accuracy may affect the accuracy of the fuel concentration learning. This configuration enables to reduce an error of the air-fuel ratio other than the evaporative gas purge, thereby to enable to improve a learning accuracy of the fuel concentration learning.

Embodiments will be described below with reference to the drawings. The present embodiment embodies a control system for an in-vehicle multi-cylinder engine. This engine control system controls, as an electronic control unit (hereinafter referred to as an ECU) being a central device, an engine. FIG. 1 is schematic diagram showing the entirety of the system.

In an engine 10 shown in FIG. 1, an airflow meter 12 is provided to the intake passage 11 for detecting an intake air amount. A throttle valve 14 is provided on the downstream side of the airflow meter 12. The throttle valve 14 is an air amount adjusting unit whose opening degree is adjusted by using a throttle actuator 13 such as a DC motor. The opening degree (throttle opening degree) of the throttle valve 14 is detected by a throttle opening sensor (not shown) incorporated in the throttle actuator 13. A surge tank 15 is provided on the downstream side of the throttle valve 14. The surge tank 15 is provided with an intake pressure sensor 16. The intake pressure sensor 16 is a sensor for detecting a pressure (throttle downstream pressure) of intake air flowing through the intake passage 11. An intake manifold 17 for introducing air into each cylinder of the engine 10 is connected to the surge tank 15. The intake passage 11 is connected to an intake port of each cylinder at the intake manifold 17.

An intake valve 18 and an exhaust valve 19 are provided in an intake port and an exhaust port of the engine 10, respectively. Air in the surge tank 15 is introduced into a combustion chamber 21 by an opening operation of the intake valve 18, and an exhaust gas after combustion is emitted to an exhaust passage 22 by an opening operation of the exhaust valve 19. A fuel injection valve 23 for directly supplying fuel into the combustion chamber 21 is attached to an upper portion of each cylinder of the engine 10. The fuel injection valve 23 is connected to a fuel tank 25 through a fuel pipe 24. Fuel stored in the fuel tank 25 is supplied to the fuel injection valve 23 through the fuel pipe 24.

An ignition plug 26 is attached for each cylinder to a cylinder head of the engine 10. A high voltage is applied to the ignition plug 26 at a desired ignition timing through an ignition device 27 that includes an ignition coil or the like. By applying this high voltage, opposing electrodes of each ignition plug 26 generates a spark discharge therebetween, and the air-fuel mixture in the combustion chamber 21 is ignited and used for combustion.

The exhaust passage 22 of the engine 10 is provided with a catalyst 28 for purifying CO, HC, NOx, and the like in exhaust gas. In this embodiment, a three-way catalyst is used as the catalyst 28. An A/F sensor 29 is provided on the upstream side of the catalyst 28. The A/F sensor 29 is an air-fuel ratio sensor that is provided to exhaust gas as the detection target and detects an air-fuel ratio (oxygen concentration) of air-fuel mixture. The A/F sensor 29 is a sensor that linearly increases or decreases the output according to the oxygen concentration in exhaust gas and is a sensor of a type that increases the output voltage as the air-fuel ratio of the air-fuel mixture increases.

A turbocharger 30, which is a supercharger, is provided between the intake passage 11 and the exhaust passage 22. The turbocharger 30 includes an intake compressor 31 that is disposed on the upstream side of the throttle valve 14 in the intake passage 11, an exhaust turbine 32 that is disposed on the upstream side of the catalyst 28 in the exhaust passage 22, and a rotation shaft 33 that connects the intake compressor 31 with the exhaust turbine 32. When the exhaust turbine 32 is rotated by the exhaust gas flowing in the exhaust passage 22, the intake compressor 31 is rotated along with the rotation of the exhaust turbine 32. Further, the intake air is compressed (supercharged) by the centrifugal force generated by the rotation of the intake compressor 31. The intake passage 11 is provided on the downstream side of the intake compressor 31 with an intercooler 34 as a heat exchanger for cooling the supercharged intake air.

This system is provided with an evaporative gas processing device 40. The evaporative gas processing device 40 is a device that processes evaporative fuel generated in the fuel tank 25 and causes the evaporative fuel to be burnet by using the engine 10. The evaporative gas processing device 40 includes a canister 41 that is filled with an adsorbent such as activated carbon. The canister 41 is connected to the fuel tank 25 through a conduit 42 and adsorbs the evaporative fuel generated in the fuel tank 25. The canister 41 is provided with an atmospheric communication passage 43 that is configured to communicate with the atmosphere and an atmospheric release valve 44 that is provided in the atmospheric communication passage 43 and opens and closes the flow path. Introduction of fresh air into the canister 41 is enabled by controlling the opening and closing of the atmospheric release valve 44. The atmospheric release valve 44 is a solenoid valve of a normally open type. The atmospheric release valve 44 is in a valve open state when not energized and is in a valve closed state when energized. A purge passage 45 communicating with the intake passage 11 is connected to the canister 41, and a purge control valve 46 is provided in an intermediate portion of the purge passage 45. The purge control valve 46 is a solenoid valve of a normally closed type. Specifically, the purge control valve 46 is closed when the being non-energized to shut off the flow of mixture gas of evaporative fuel and air (hereinafter, also referred to as "purge gas"). Further, the purge control valve 46 is opened when energized to allow the flow of purge gas. The opening degree of the purge control valve 46 is adjusted by changing its energization duty ratio.

The evaporative gas processing device 40 is a two-system purge system to purge the evaporative fuel into the intake passage 11 through different passages in a non-supercharged state in which the intake air is not supercharged by the turbocharger 30 and in a supercharged state in which intake air is supercharged. Specifically, the purge passage 45 is branched on the downstream side of the purge control valve 46. The branched branch passages include a first purge passage 45a, which is connected to the downstream side of the throttle valve 14 in the intake passage 11, and a second purge passage 45b, which is connected to the upstream side of the intake compressor 31.

The first purge passage 45a is provided with a first check valve 47 as a first check valve that is opened by an intake negative pressure on the downstream side of the throttle valve 14. The first check valve 47 shuts off backflow of air from the intake passage 11 toward the purge passage. Further, the second purge passage 45b is provided with an ejector 49 that is operated by supercharged air generated by the intake compressor 31 and a second check valve 48 as a second check valve opened by the operation of the ejector 49. The second check valve 48 shuts off backflow of air from the intake passage 11 toward the purge passage.

The ejector 49 is a fluid pump operated by supercharged intake air. Specifically, the ejector 49 includes a first introduction port 49a, a second introduction port 49b, and a discharge port 49c. The first introduction port 49a is connected to an intermediate portion between the intake compressor 31 and the throttle valve 14 in the intake passage 11 through a pipe 51. The second introduction port 49b is connected to the second check valve 48. The discharge port 49c is connected to the upstream side of the intake compressor 31. In the ejector 49, a nozzle portion is formed inside the first introduction port 49a. When the supercharged air, which is a high-pressure fluid, is introduced into the first introduction port 49a, the supercharged air is depressurized at the nozzle portion, and the purge gas is drawn from the second introduction port 49b. The purge gas drawn from the second introduction port 49b is discharged to the upstream of the intake compressor 31 through the discharge port 49c.

In addition, this system is provided with a crank angle sensor 52, which outputs a crank angle signal for each predetermined crank angle of the engine 10, a cooling water temperature sensor 53, which detects a cooling water temperature of the engine 10, a tank internal pressure sensor 54 provided in the fuel tank 25 and detecting pressure of fuel in the fuel tank 25, and the like.

An ECU 60 mainly includes a microcomputer (hereinafter, referred to as a microcomputer 61) including a CPU, a ROM, a RAM, and the like, as is well known, and executes various control programs stored in the ROM to perform various controls of the engine 10. Specifically, the microcomputer 61 inputs various detection signals and the like from the various sensors described above and controls the drive of the fuel injection valve 23, the ignition device, and the like based on the input various detection signals and the like. The ECU 60 causes fuel injection in the intake stroke of each cylinder to perform homogeneous combustion to burn a homogeneous mixture of fuel and air formed in the cylinder, thereby to operate the engine 10.

In addition, the microcomputer 61 switches between a stoichiometric combustion mode and a lean combustion mode as the operation mode of the engine 10 to control the operation of the engine 10. In the stoichiometric combustion mode, the target air-fuel ratio is set to the theoretical air-fuel ratio, and the engine 10 is operated. In the lean combustion mode, the target air-fuel ratio is set to the lean side of the theoretical air-fuel ratio, and the engine 10 is operated. In the present embodiment, the stoichiometric combustion mode is the operation mode selected in a period in which the rotation speed of the engine 10 is in an idle rotation region or in which the engine 10 is operated in a high load region. The lean combustion mode is an operation mode selected in a period in which the engine 10 is operated in a low load or in a medium load region.

The microcomputer 61 controls the opening degree of the purge control valve 46, thereby to perform an evaporative purge control in which the evaporative fuel adsorbed on the canister 41 is burned by the engine 10. Specifically, the purge control valve 46 is opened while the atmospheric release valve 44 is opened in response to an evaporative gas purge request. As a result, the evaporative fuel adsorbed on the canister 41 is discharged to the intake passage 11 as purge gas together with air taken from the atmospheric communication passage 43. The evaporative gas purge request includes at least one of, for example, a condition satisfied when a value of the tank internal pressure sensor 54 has exceeded the determination value, a condition satisfied when a predetermined time (for example, a dozen seconds to a few tens of seconds) has passed since the last purge execution, a condition satisfied when a mileage since the last purge execution has exceeded a specified distance, and the like.

In order to realize an optimum air-fuel ratio control even during the implementation of the evaporative gas purge control, the microcomputer 61 performs an evaporative gas concentration learning to estimate a fuel concentration (hereinafter, also referred to as "evaporative gas concentration") in the purge gas discharged from the canister 41 to the intake passage 11 based on the air-fuel ratio detected by using the A/F sensor 29 and to update the estimated evaporative gas concentration as a concentration learning value. Further, the microcomputer 61 reduces and corrects the amount of fuel injected from the fuel injection valve 23 by using the concentration learning value updated by the evaporative gas concentration learning during the period in which the purge gas is discharged to the intake passage 11 in response to the evaporative gas purge request.

Specifically, the opening degree of the purge control valve 46 is changed, and the current evaporative gas concentration is estimated based on an amount of change in the air-fuel ratio acquired by using the NF sensor 29 and an amount of change in the purge flow rate before and after that (for example, before and after the closed valve is opened and before and after the opening is changed to increase). In addition, the concentration learning value is updated with the estimated value as the actual evaporative gas concentration. A predetermined time has elapsed after the evaporative gas concentration learning is started (more specifically, a time, which is required for the output of the A/F sensor 29 to stabilize, has elapsed after the opening degree of the purge control valve 46 is changed), and the evaporative gas concentration learning is completed. After then, the microcomputer 61 reduces and corrects the fuel injection amount of the fuel injection valve 23 such that the sum of the amount of fuel in the purge gas and the amount of fuel injected by the fuel injection valve 23 satisfies a target air-fuel ratio Atg, which is computed based on the engine operating state (for example, engine load, engine rotation speed, etc.) at each time. In this embodiment, the evaporative gas concentration learning is performed at predetermined time intervals (for example, at intervals of several tens of seconds to several minutes). The learning frequency is not particularly limited and may be determined based on, for example, a canister capacity, a fuel tank capacity, and the like.

Herein, in an assumable configuration where the correction of the fuel injection amount of the fuel injection valve 23 is started after the evaporative gas concentration learning is completed, a delay arises before the correction of the fuel injection amount is appropriately performed. In a case where a delay arises in the correction of the fuel injection amount, a concern arises that a fluctuation in the torque and deterioration in the emission may occur until the correction of the fuel injection amount using the evaporative gas concentration learning value is started.

In particular, in a case where the engine is operation in lean combustion mode, the operating state of the engine 10 is controlled, such that the air-fuel ratio falls within a range between a rich side air-fuel ratio (NOx limit), which is limited by NOx emissions, and a lean side air-fuel ratio (misfire limit), which is limited to suppress misfire, with respect to a target air-fuel ratio (for example, the air-fuel ratio corresponding to a value about $\lambda=1.6$). From a viewpoint of preferably suppressing fluctuations in the torque and deterioration in the emission, it is desirable to control the air-fuel ratio between the NOx limit and the misfire limit in a period in which the evaporative gas concentration learning is performed.

Therefore, in this embodiment, the fuel injection amount by which fuel injected from the fuel injection valve 23 is corrected based on the concentration learning value, and fuel is injected from the fuel injection valve 23 by the corrected fuel injection amount in the period in which the evaporative gas concentration learning is performed while the engine is in operation in the lean combustion mode (hereinafter, also referred to as "evaporative gas concentration learning period").

The evaporative gas concentration learning performed during the engine is in operation in the lean combustion mode will be described in detail below. First, a procedure of an evaporative gas concentration learning process in the lean combustion mode will be described with reference to the flowchart of FIG. 2. This process is repeatedly executed by the microcomputer 61 at predetermined intervals.

Figure 2:
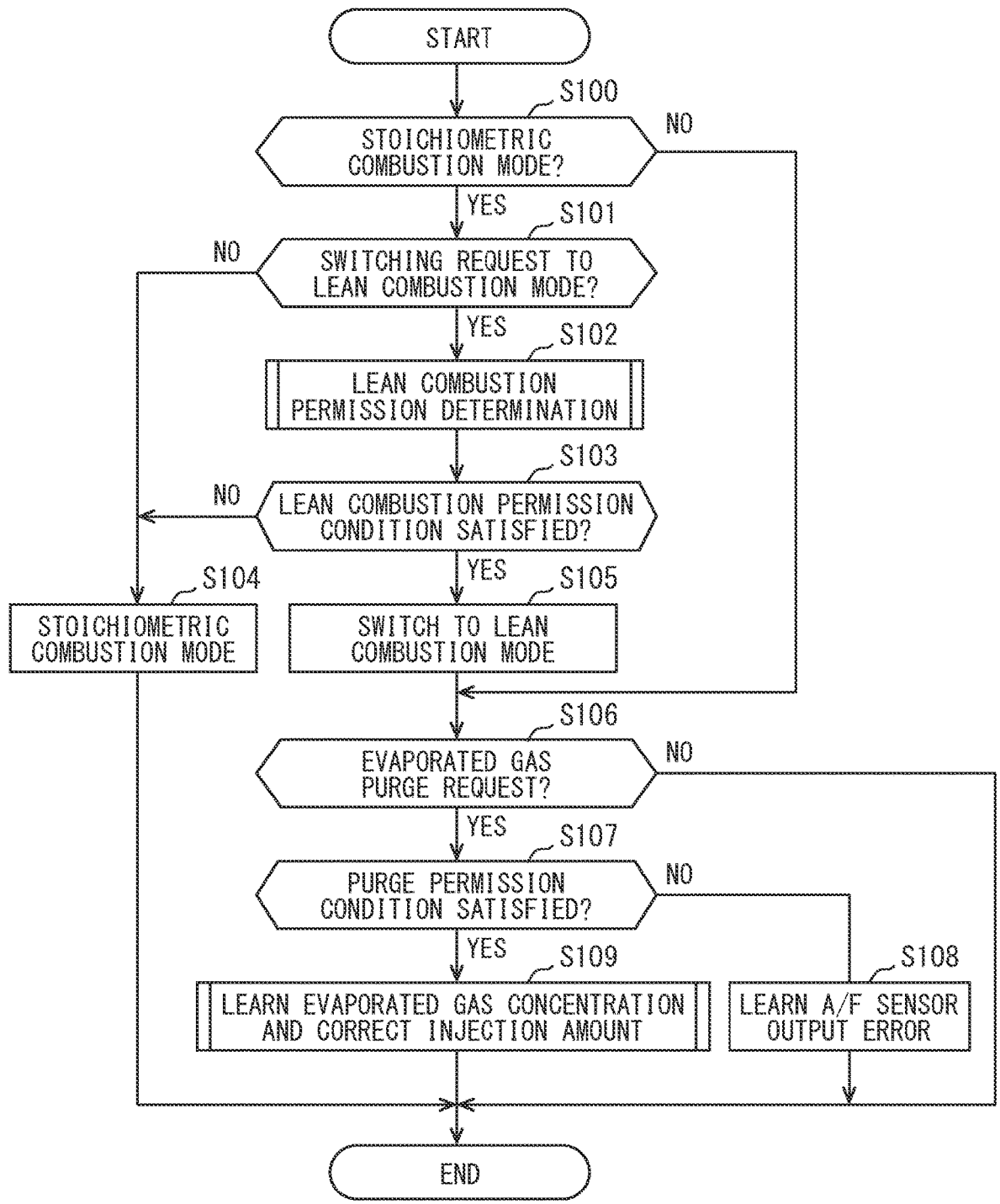
FIG. 2 is a flowchart showing an entirety of a procedure of an evaporative gas concentration learning performed in a lean combustion mode.
Figure 3:
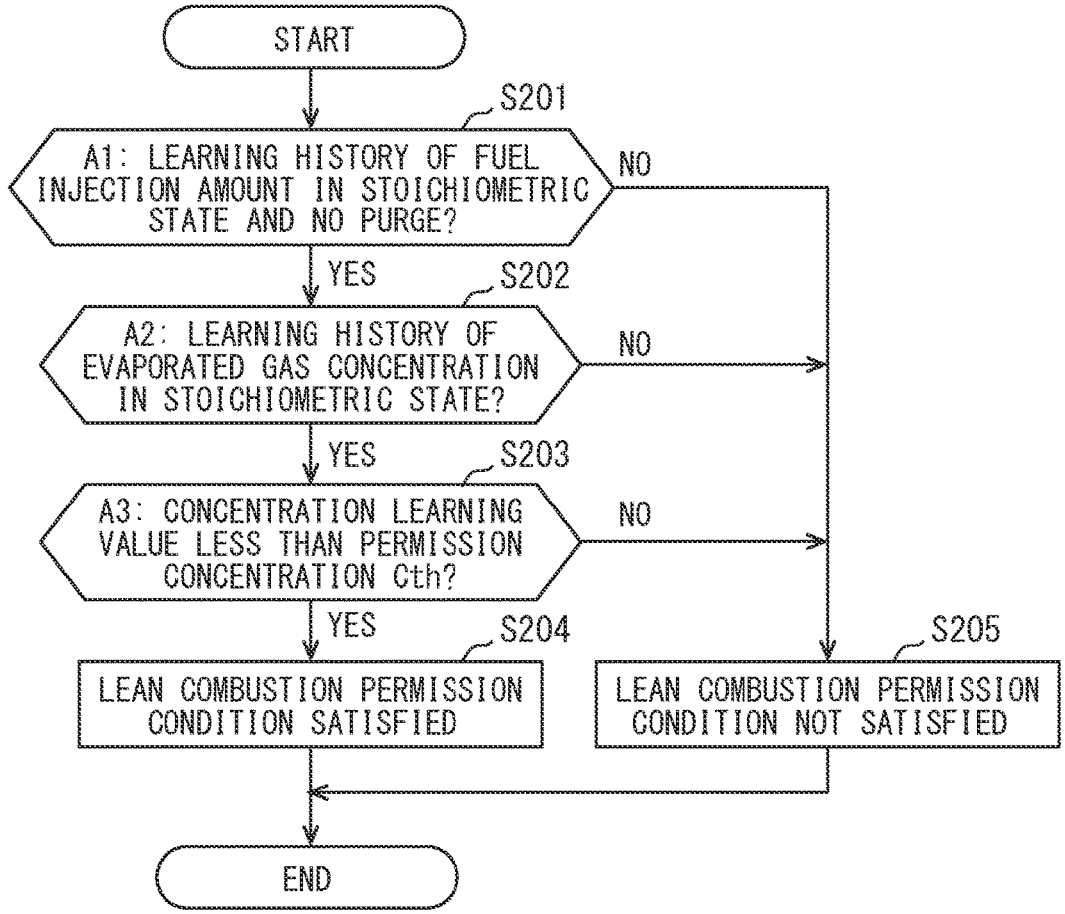
FIG. 3 is a flowchart showing a procedure of a lean combustion permission determination process.

In FIG. 2, in step S100, it is determined whether or not the operation mode of the engine 10 is the stoichiometric combustion mode. When an affirmative determination is made in step S100, the process proceeds to step S101, and it is determined whether or not a switching request for the operation mode from the stoichiometric combustion mode to the lean combustion mode has occurred. Whether or not there is the switching request to switch to the lean combustion mode is determined based on the engine speed and the engine load. When it is determined that the switching request to switch to the lean combustion mode has occurred, the process proceeds to step S102, and the lean combustion permission determination process shown in FIG. 3 is executed.

A lean combustion permission determination process is a process for determining whether or not to switch the operation mode from the stoichiometric combustion mode to the lean combustion mode. In the lean combustion permission determination process, is determined whether the following three conditions (conditions A1 to A3) are satisfied, and it is determined that the lean combustion permission condition is satisfied when all the conditions A1 to A3 are satisfied.

A1: There is a learning history of performing an injection amount learning to learn the fuel injection amount, by which fuel is injected from the fuel injection valve 23, based on an amount of deviation between a command injection amount for the fuel injection valve 23 and an actual fuel injection amount when the engine is in operation in stoichiometric combustion mode.

A2: There is a learning history in which evaporative gas concentration learning has been performed when the engine is in operation in the stoichiometric combustion m ode.

A3: The evaporative gas concentration, which has been learned while the engine is in operation in the stoichiometric combustion mode (hereinafter, also referred to as "stoichiometric concentration learning value Cst") is lower than a permission concentration Cth at which switching to the lean combustion mode is permitted.

That is, in FIG. 3, in step S201, it is determined whether or not the condition A1 is satisfied, and in step S202, it is determined whether or not the condition A2 is satisfied. The concentration learning value when the evaporative gas concentration learning is performed during the engine is in operation in the stoichiometric combustion mode is stored, as the stoichiometric concentration learning value Cst, in a storage unit of the microcomputer 61. Further, in step S203, it is determined whether or not the condition A3 is satisfied. In a case where affirmative determinations are made in all of steps S201 to S203, the process proceeds to step S204, in which it is determined that the lean combustion permission condition is satisfied. On the other hand, when a negative determination is made in at least one of steps S201 to S203, the process proceeds to step S205, and it is determined that the lean combustion permission condition is not satisfied. Then, this process is terminated.

Each of the conditions A1 to A3 will be described in more detail. Specifically, the condition A1 is a condition for determining that the injection amount deviation of the fuel injection valve 23 has not occurred. That is, the condition A1 is a condition to reduce an error factor as much as possible in the purge concentration learning in the stoichiometric combustion state where a stability of the combustion is higher than that in the lean combustion before the operation mode of the engine 10 is switched from the stoichiometric combustion mode to the lean combustion mode. The injection amount learning is performed based on the amount of the deviation between the command injection amount for the fuel injection valve 23 and the actual fuel injection amount in a state where no purge gas is discharged into the intake passage 11.

The condition A2 is a condition for determining whether the concentration learning value acquired in the evaporative gas concentration learning in the stoichiometric combustion state exists. The stoichiometric concentration learning value Cst may be a value, which is learned when the fuel injection valve 23 injects fuel during the concentration learning period, and may be a value, which is learned when fuel injection by using the fuel injection valve 23 is stopped during the concentration learning period.

The condition A3 is a condition defined in consideration that while the purge gas is being supplied, it is necessary to reduce the fuel injection amount of the fuel injection valve 23 as the evaporative gas concentration is higher, and to the contrary, the fuel injection valve 23 has a minimum fuel injection amount (minimum injection amount) by which the fuel injection valve 23 is capable of injecting fuel. In the lean combustion operation, an equivalent torque can be produced with a smaller amount of fuel, compared to the stoichiometric combustion operation, and therefore, the condition A3 is set in consideration that limitation due to the minimum injection amount likely occurs. In this embodiment, it is determined that the conditions A1 and A2 are satisfied in a case where there is a history that the learning has been performed during the engine is in operation in the stoichiometric combustion mode immediately before switching to lean combustion mode Returning to the description of FIG. 2, in the following step S103, it is determined whether or not the lean combustion permission condition is satisfied. When the lean combustion permission condition is not satisfied, the process proceeds to step S104, in which switching to the lean combustion mode is prohibited, and the operation in the stoichiometric combustion mode is continued. On the other hand, when the lean combustion permission condition is satisfied, the process proceeds to step S105, in which the operation mode of the engine 10 is switched from the stoichiometric combustion mode to the lean combustion mode. In the following step S106, it is determined whether or not there is an evaporative gas purge request. At this time, when there is no evaporative gas purge request, this routine is temporarily terminated. On the other hand, when there is the evaporative gas purge request, the process proceeds to step S107 in which it is determined whether or not the purge execution permission condition is satisfied.

The purge execution permission condition is a condition for permitting the discharge of the purge gas to the intake passage 11 after switching to the lean combustion mode. The present embodiment includes the following condition B1.

B1: There is a history of performing an output error learning of the A/F sensor 29 during a period in which the engine is in operation in the lean combustion mode and the discharge of the purge gas to the intake passage 11 is prohibited.

The purge execution permission condition may include another condition other than the condition B1. The other condition may include, for example, that the engine operating state is not in a transient state.

Specifically, in the output error learning, the target air-fuel ratio Atg during the operation in the lean combustion mode is compared with a detected air-fuel ratio Adt detected by using the A/F sensor 29, in a state where no purge gas is discharged into the intake passage 11. Then, the difference between the target air-fuel ratio Atg and the detected air-fuel ratio Adt is stored as an output error ΔAo of the A/F sensor 29, and the output value of the A/F sensor 29 is corrected based on the output error ΔAo. The output error ΔAo corresponds to the "air-fuel ratio deviation amount", and the output error learning corresponds to the "air-fuel ratio learning".

Figure 4:
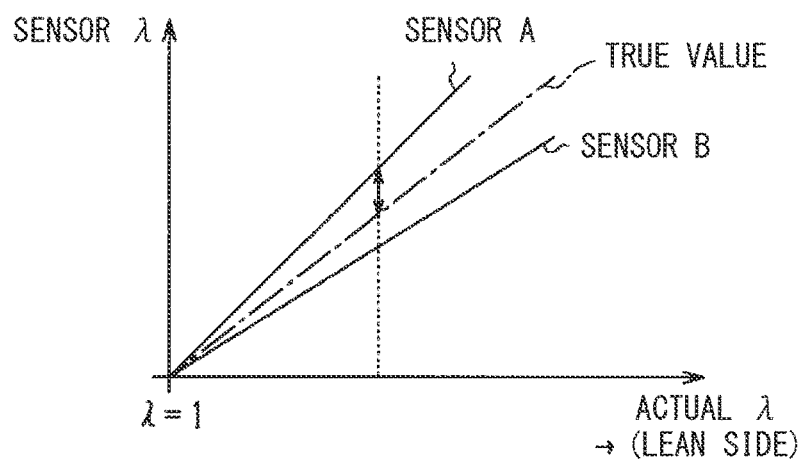
FIG. 4 is a view showing the relationship between a detection value of an A/F sensor and an actual air-fuel ratio.

Herein, the output characteristic of the A/F sensor 29 exhibits that an output error appears larger in the lean combustion region than in the stoichiometric combustion region. FIG. 4 shows a relationship between the detected value of the A/F sensor 29 and the actual air-fuel ratio. In FIG. 4, the air-fuel ratio is indicated by the value of λ. In FIG. 4, the alternate long and short dash line represents a true value, and the two solid lines (sensor A and sensor B) represent the characteristics of the sensor having an output error with respect to the true value. As shown in FIG. 4, at the stoichiometric air-fuel ratio (λ=1), the individual difference in the deviation of the sensor λ with respect to the actual λ is small, and the sensor detection accuracy is high in any of the sensors. On the other hand, when the target λ is on the lean side, the individual difference in the sensor output becomes large. Further, in a sensor in which deviation occurs in its sensor output, the deviation from the actual λ becomes larger as the target λ is further on the lean side.

Due to these sensor output errors, although the air-fuel ratio of the engine 10 is actually controlled at the target air-fuel ratio Atg, the detected air-fuel ratio Adt may deviate from the target air-fuel ratio Atg due to the output error of the A/F sensor 29. In this case, even though the evaporative gas concentration learning is performed during the operation in the lean combustion mode, a concern arises that the evaporative gas concentration cannot be estimated accurately, due to that the output error of the A/F sensor 29 is included. In consideration of this, in the present embodiment, when the evaporative gas concentration learning is performed during the operation in the lean combustion mode, the output error learning of the A/F sensor 29 is performed before the evaporative gas concentration learning is performed. In this way, this configuration enables highly accurate evaporative gas concentration learning even in a lean combustion region where the detection accuracy of the A/F sensor 29 is low.

Figure 5:
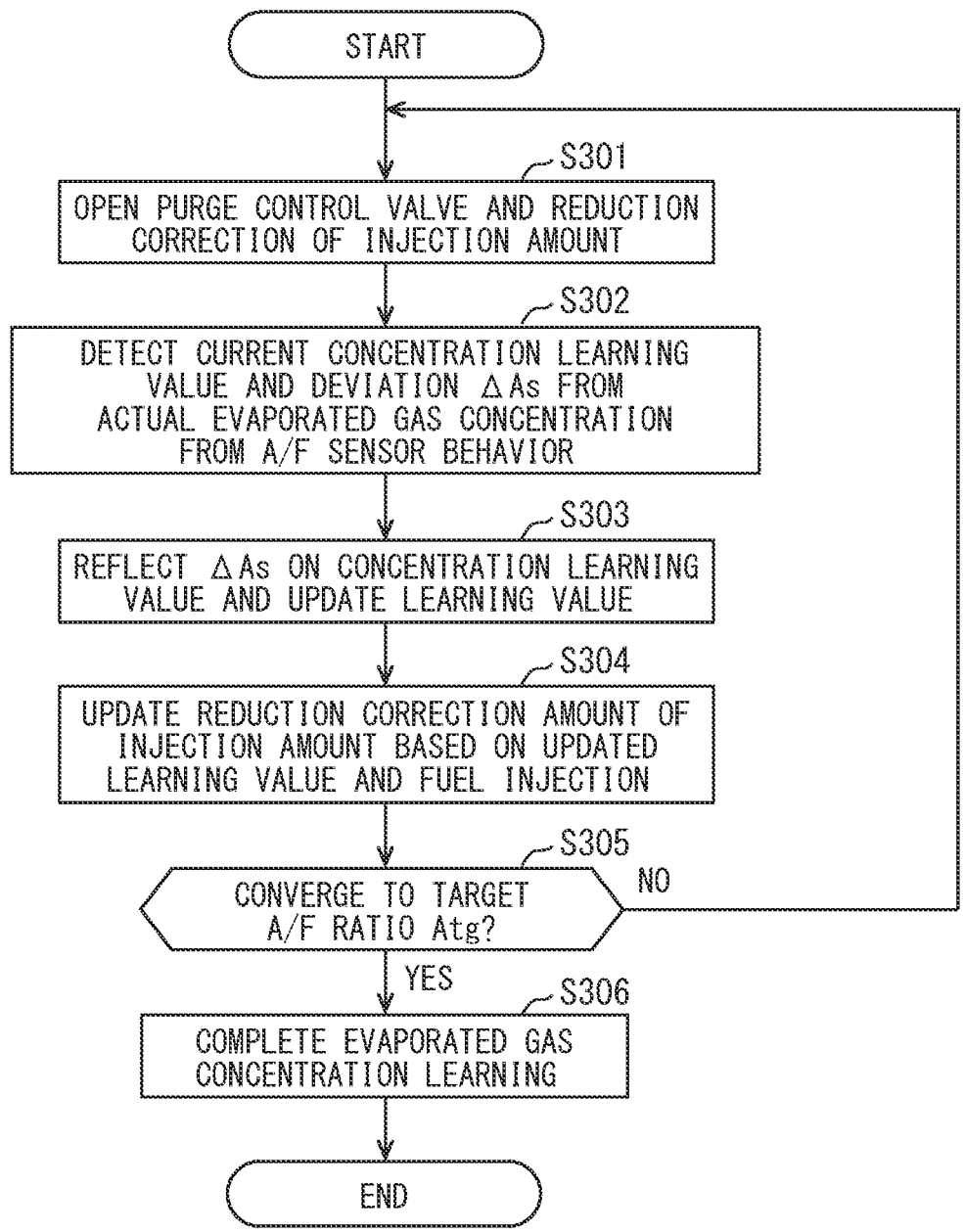
FIG. 5 is a flowchart showing a procedure of an evaporative gas concentration learning/injection amount correction process.

In a case where the purge execution permission condition is not satisfied, that is, after switching to the lean combustion mode, when there is no history of performing the output error learning of the A/F sensor 29 in a state where purge gas is not discharged to the intake passage 11, a negative determination is made in step S107. In this case, the process proceeds to step S108. In step S108, the output error learning of the A/F sensor 29 is performed. Specifically, the output error ΔAo is acquired as the amount of deviation between the target air-fuel ratio Atg and the detected air-fuel ratio Adt, and the output value of the A/F sensor 29 is corrected by using the output error ΔAo. After that, this routine is terminated once. On the other hand, when an affirmative determination is made in step S107, the process proceeds to step S109, and the evaporative gas concentration learning/injection amount correction process shown in FIG. 5 is performed.

The evaporative concentration learning/injection amount correction process in the operation in the lean combustion mode will be described with reference to the flowchart in FIG. 5. In FIG. 5, in step S301, the purge control valve 46 is opened to the target opening degree. At the same time, the fuel injection amount of the fuel injection valve 23 is reduced and corrected according to the concentration learning value and the target opening degree such that the detected air-fuel ratio Adt matches the target air-fuel ratio Atg. Immediately after the start of evaporative gas concentration learning, the stoichiometric concentration learning value Cst learned during the engine operation in the immediately preceding stoichiometric combustion mode is used as the concentration learning value. When the evaporative gas concentration learning is started in the lean combustion mode at this time, and the concentration learning value is updated during the evaporative gas concentration learning, the concentration learning value updated each time during the evaporative gas concentration learning is used.

Figure 6:
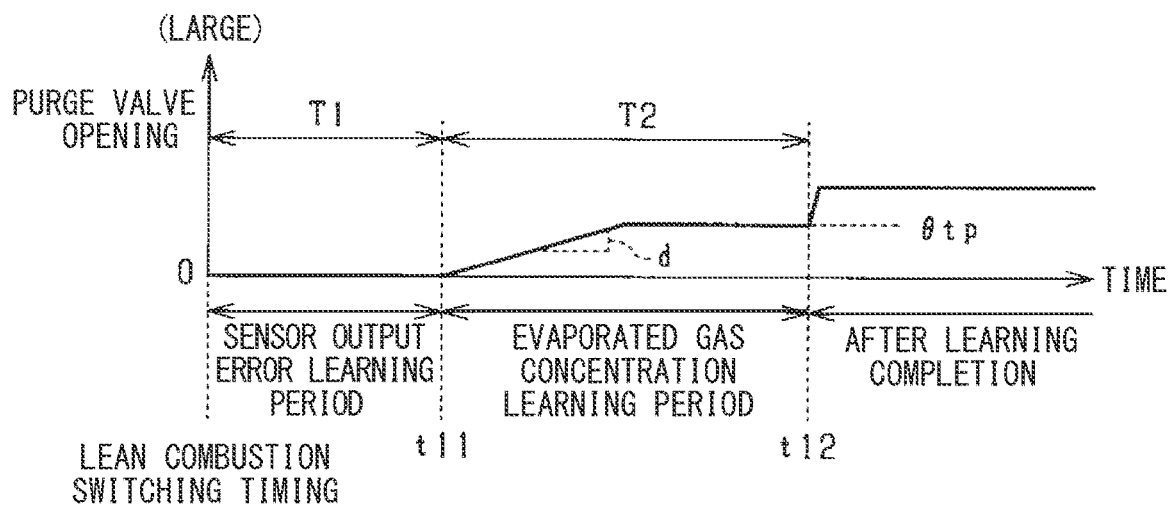
FIG. 6 is a timechart showing a transition of a purge valve opening degree after switching to a lean combustion mode.

FIG. 6 is a diagram showing a transition of a target opening degree (purge valve opening degree) of the purge control valve 46 after switching to the lean combustion mode. A predetermined time (for example, 1 to 2 seconds) after switching the operation mode to the lean combustion mode is a learning period T1 of the sensor output error of the A/F sensor 29. In the learning period T1 of the sensor output error, the target opening degree of the purge control valve 46 is set to zero to prohibit the purge execution.

When a predetermined time elapses from the switching timing to the lean combustion mode, the execution of the evaporative gas concentration learning is started at time t11. In the evaporative gas concentration learning period T2, first, the target opening degree is set such that the purge valve opening degree gradually increases to the upper limit value θtp with a predetermined inclination d. After the purge valve opening has increases to the upper limit value θtp, the target opening is maintained at the upper limit value θtp. In the evaporative gas concentration learning period T2, the purge valve opening is gradually increased to the upper limit value θtp. In addition, the upper limit guard is provided to the purge valve opening. In this way, this configuration prevents the air-fuel ratio from suddenly changing even when the amount of deviation between the current concentration learning value and the actual evaporative gas concentration is large. After the time t12 subsequent to the completion of the evaporative gas concentration learning, the target opening degree is set so as to further open the purge valve opening degree that is calculated based on the engine operating state. When the purge valve opening degree is gradually increased to the upper limit value θtp, the purge valve opening degree may be gradually changed to the valve opening side.

Figure 7:
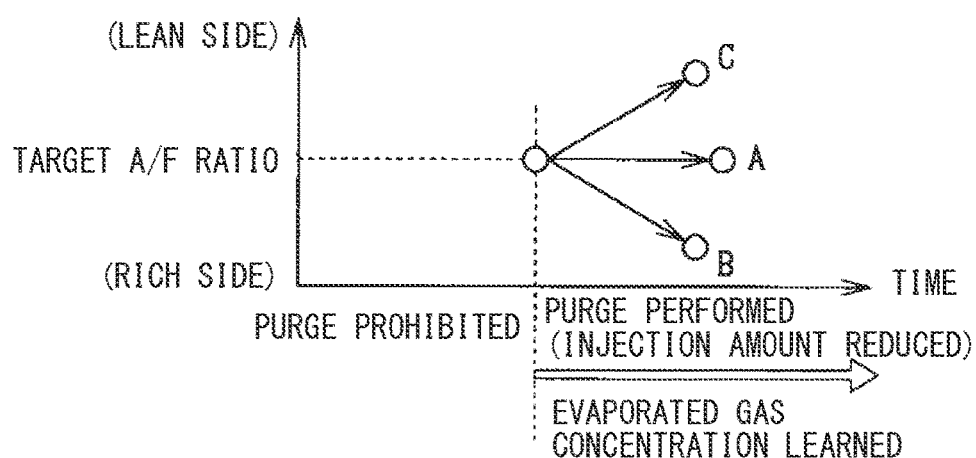
FIG. 7 is a view showing the relationship between an actual evaporative gas concentration and a concentration learning value.

Returning to the description of FIG. 5, in step S302, the air-fuel ratio deviation amount ΔAs, which is caused by the deviation between the current concentration learning value and the actual evaporative gas concentration, is detected from the behavior of the A/F sensor 29. The relationship between the actual evaporative gas concentration and the concentration learning value will be described with reference to FIG. 7.

When the actual evaporative gas concentration is equal to the current concentration learning value, the amount, by which the fuel injection amount of the fuel injection valve 23 is reduced and corrected, and the amount, by which fuel is increased due to the release of purge gas, become equal to each other. In this case, the output of the A/F sensor 29 does not fluctuate (A in FIG. 7). To the contrary, in a case where the actual evaporation concentration is higher than the current concentration learning value, the amount, by which fuel is increased due to the release of the purge gas, becomes larger than the amount, by which the fuel injection amount is reduced and corrected. In this case, the output of the A/F sensor 29 shifts to the rich side by the deviation of the concentration learning value (B in FIG. 7). In a case where the actual evaporation concentration is lower than the current concentration learning value, the amount, by which the fuel injection amount is reduced and corrected, becomes larger than the amount, by which fuel is increased due to the release of the purge gas. In this case, the output of the A/F sensor 29 shifts to the lean side by the deviation of the concentration learning value (C in FIG. 7). Due to this sensor behavior, the air-fuel ratio deviation amount ΔAs, which is caused by the deviation between the current concentration learning value and the actual evaporation concentration, is detected.

In step S303 in FIG. 5, the air-fuel ratio deviation amount ΔAs is reflected as the deviation of the concentration learning value on the concentration learning value, and the concentration learning value is updated. Specifically, when the current concentration learning value is higher than the actual evaporative gas concentration, the concentration learning value is corrected to be the decreased according to the air-fuel ratio deviation amount ΔAs. Contrary, when the current concentration learning value is lower than the actual evaporative gas concentration, the concentration learning value is corrected to be the increased according to the air-fuel ratio deviation amount ΔAs.

In the following step S304, the reduction correction amount of the fuel injection amount of the fuel injection valve 23 is updated based on the updated concentration learning value. Specifically, when the concentration learning value after the update is higher than the concentration learning value before the update, the reduction correction amount of the fuel injection amount is increased. When the concentration learning value after the update is lower than the concentration learning value before the update, the reduction correction amount of the fuel injection amount is decreased. Then, this process is terminated.

In step S305, it is determined whether or not the detected air-fuel ratio Adt has converged to the target air-fuel ratio Atg. When the detected air-fuel ratio Adt has not converged to the target air-fuel ratio Atg, the process returns to step S301, and the processes after step S301 are repeated. On the other hand, when the detected air-fuel ratio Adt has converged to the target air-fuel ratio Atg, the process proceeds to step S306, in which the evaporative gas concentration learning is completed. Thus, this process is completed.

Figure 8:
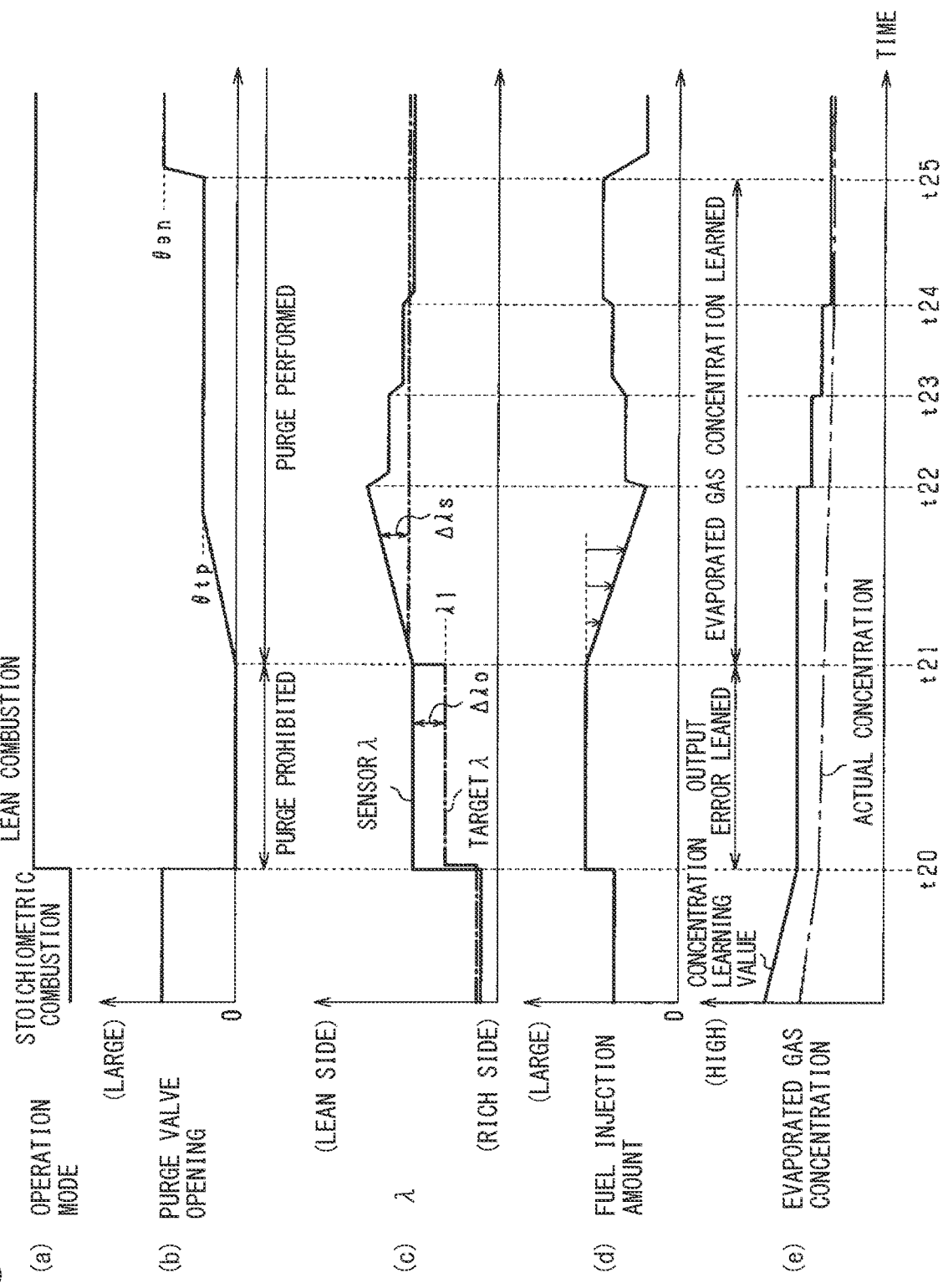
FIG. 8 is a timechart showing a specific example of an evaporative gas concentration learning in the lean combustion mode.

Next, a specific mode of the evaporative gas concentration learning in the lean combustion mode will be described with reference to the time chart in FIG. 8. In FIG. 8, (a) shows the transition of the operation mode of the engine 10, (b) shows the transition of the opening degree (purge valve opening degree) of the purge control valve 46, (c) shows the transition of the detection value of the A/F sensor 29, (d) shows the transition of the fuel injection amount of the fuel injection valve 23, and (e) shows the transition of the concentration learning value (solid line) of the purge gas and the actual evaporative gas concentration (dashed line). In FIG. 8, it is assumed that the concentration learning value Cst updated in the stoichiometric combustion mode is higher than the actual evaporative gas concentration (see (e) in FIG. 8E). In FIG. 8, the air-fuel ratio is indicated by the value of λ. In (c) in FIG. 8, the solid line shows the transition of the sensor λ, and the alternate long and short dash line shows the transition of the target λ.

In FIG. 8, when the request to switch to the lean combustion mode arises during the engine is in operation in the stoichiometric combustion mode, the operation mode of the engine 10 is switched from the stoichiometric combustion mode to the lean combustion mode on condition that the lean combustion permission conditions (A1 to A3) are satisfied (time t20). In a predetermined time (for example, 1 to 2 seconds) immediately after the engine is switched to the lean combustion mode, the release of purge gas is prohibited, and an output error learning of the A/F sensor 29 is executed (time t20 to t21). By this output error learning, the difference between the target λ and the sensor λ is stored as the output error Δλo, and the target λ (λ1 in FIG. 8) is corrected by the output error Δλo.

With the completion of the output error learning, the purge control valve 46 is gradually opened at the inclination d, and the purge gas having a flow rate corresponding to the opening degree of the purge valve is discharged to the intake passage 11. At this time, the purge valve opening degree is limited by the upper limit value θtp on the valve closing side with respect to the target opening degree Ben that is set based on the engine operating state. In FIG. 8, it is assumed that the stoichiometric concentration learning value Cst is higher than the actual evaporative gas concentration. In this case, the fuel injection amount is reduced by a large amount at the beginning of the evaporative gas concentration learning (time t21 to t22 in (d) in FIG. 8). Further, as the fuel injection amount is reduced by the large amount, the output of the A/F sensor 29 shifts to the lean side by an excessive amount of the injection amount that is decreased (see the solid line in (c) in FIG. 8).

In the present embodiment, the deviation amount Δλs of the sensor output at this time is assumed to be caused by the deviation of the concentration learning value with respect to the actual evaporative gas concentration. On this assumption, the concentration learning value is updated for multiple times at predetermined intervals during the evaporative gas concentration learning (see time t22, t23, and t24 in (e) in FIG. 8). Further, each time the concentration learning value is updated, the fuel injection amount is corrected each time so that the sensor λ matches the target λ (see the times t22, t23 and t24 in (d) in FIG. 8). Eventually, when the sensor λ converges to the target λ (after the time t24 in FIG. (c) in 8), the evaporative gas concentration learning is completed.

After the evaporative gas concentration learning is completed, the upper limit guard of the purge valve opening is released. In addition, the purge control valve 46 is opened according to the purge rate that is set based on the engine operating state, and the fuel injection amount is reduced and corrected according to the purge valve opening degree and the concentration learning value that is updated when the evaporative gas concentration learning is completed. To.

According to the present embodiment described in detail above, the following excellent effects can be obtained.

The configuration performs the evaporative gas concentration learning while correcting the injection amount according to the concentration learning value, when the evaporative gas concentration learning is performed during the lean combustion operation. This configuration enables to cause the fuel injection valve 23 to inject fuel by an amount of fuel that is expected to be released into the intake passage 11 by the evaporator purge, during the evaporative gas concentration learning. As a result, when performing the evaporative gas concentration learning in the lean combustion operation, the configuration enables to suppress the fluctuation of the air-fuel ratio due to the delay in the injection amount correction until the learning is completed.

Even in a case where the evaporative gas purge request arises during the lean combustion operation, the configuration does not start the evaporative gas purge immediately with the evaporative gas purge request. The configuration first detects the amount of the deviation between the target air-fuel ratio Atg and the detected air-fuel ratio Adt (output error ΔAo) without performing the evaporative gas purge thereby to eliminate the air-fuel ratio deviation when the engine is in operation with the lean combustion. After that, the configuration performs the evaporative gas concentration learning. Due to the output characteristics of the A/F sensor 29, the sensor detection accuracy is lower in the lean combustion region than that in the stoichiometric combustion region. A concern arises that such a decrease in the sensor detection accuracy may affect the accuracy of the evaporative gas concentration learning. In consideration of this point, in the evaporative gas concentration learning during the lean combustion operation, the configuration performs the output error learning of the A/F sensor 29, and thereafter, permits the evaporative gas purge and performs the evaporative gas concentration learning, thereby to enable to sufficiently secure the learning accuracy of the evaporative gas concentration learning.

In the fuel injection control during the evaporative gas concentration learning period T2, the configuration controls the fuel injection amount so that the detected air-fuel ratio Adt converges to the target air-fuel ratio Atg. Therefore, the configuration enables to appropriately control the air-fuel ratio during the learning period and to perform the control suitable for suppressing torque fluctuation and emission deterioration.

The configuration permits the switching from the stoichiometric combustion mode to the lean combustion mode, on condition that there is the learning history of the fuel injection amount learning when the engine is in operation in the stoichiometric combustion mode, and performs the evaporative gas concentration learning in the lean combustion operation after the permission. In a case where a deviation arises between the command injection amount to the fuel injection amount and the actual injection amount, a concern arises that the deviation in the injection amount is reflected on the detection value of the A/F sensor 29. Consequently, a concern arises that the amount of the deviation between the concentration learning value of the evaporative gas concentration learning and the actual evaporative gas concentration cannot be detected accurately due to a change in the air-fuel ratio when the evaporative gas concentration learning is performed. In consideration of this point, the configuration performs the evaporative gas concentration learning in the lean combustion operation on the condition that the fuel injection amount learning has been performed in the stoichiometric combustion region where the detection accuracy of the A/F sensor 29 is higher. In this way, the configuration enables to further improve the learning accuracy of the evaporative gas concentration learning.

The configuration corrects the fuel injection amount in the evaporative gas concentration learning by using the concentration learning value (stoichiometric concentration learning value Cst) that has been learned when the engine is in operation in the stoichiometric combustion mode, at the beginning of the evaporative gas concentration learning in a case where the evaporative gas concentration learning is performed after switching from the stoichiometric combustion mode to the lean combustion mode. This configuration enables to decrease and correct the fuel injection amount by using the concentration learning value, which has been learned in the stoichiometric combustion operation that is higher in combustion stability, when learning the evacuation concentration during the lean combustion operation. Therefore, the configuration enables to perform the air-fuel ratio control more appropriately in the evaporative gas concentration learning period T2.

In the period, in which the evaporative gas concentration learning is performed in the lean combustion operation, the configuration corrects the fuel injection amount by using the concentration learning value updated before the evaporative gas concentration learning is completed. That is, when performing the evaporative gas concentration learning in the lean combustion operation, the configuration performs the evaporative gas concentration learning while correcting the injection amount each time based on the concentration learning value that is updated in the evaporative gas concentration learning period. This configuration is preferable in that the configuration enables to reduce and correct the fuel injection amount more appropriately and to perform the air-fuel ratio control in the evaporative gas concentration learning period T2 more appropriately.

In the period in which the evaporative gas concentration learning is performed during the lean combustion operation, the configuration limits the purge gas flow rate of the purge gas to the intake passage 11. Specifically, in the evaporative gas concentration learning period T2, the configuration reduces the amount of change in the purge valve opening per unit time and gradually increases the purge valve opening to the upper limit guard value (upper limit value θtp). In addition, the configuration limits the maximum value of the purge valve opening in the evaporative gas concentration learning at the upper limit value θtp. This configuration enables to suppress a sudden change in the air-fuel ratio even in a case where the difference between the current concentration learning value and the actual evaporative gas concentration is large. Further, the flow rate accuracy is higher when the opening degree is low, and therefore, this configuration is preferable in that this configuration enables to enhance the learning accuracy of the evaporative gas concentration learning.

Other Embodiment

The present disclosure is not limited to the embodiments describe above, and may be implemented, for example, as follows.

In the above embodiment, in a case where all the three conditions A1 to A3 are satisfied, the evaporative gas concentration learning is performed on assumption that the lean combustion permission condition is satisfied. It is noted that, in a case where a part of the conditions A1 to A3 is satisfied, the evaporative gas concentration learning may be performed on assumption that the lean combustion permission condition is satisfied.

In the above embodiment, the purge gas flow rate to the intake passage 11 is limited in the evaporative gas concentration learning. It is noted that, the purge gas flow rate may be constant in the evaporative gas concentration learning and after the learning is completed.

In the above embodiment, the case where the present disclosure is applied to a system in which the engine 10 is operated by homogeneous combustion has been described. It is noted that, the present disclosure may be applied to a system in which the engine 10 is operated by homogeneous combustion and stratified combustion.

In the above embodiment, the turbocharger 30 is provided as the supercharger. It is noted that, the turbocharger 30 may not be provided. Further, the present disclosure may be applied to a configuration including a supercharger driven by power from the output shaft of the engine 10 or driven by power of an electric actuator such as a motor instead of the turbocharger 30.

Although the disclosure has been described in accordance with the embodiments, it is understood that the present disclosure is not limited to such embodiment or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. An evaporative fuel processing device applicable to an internal combustion engine that is provided with a fuel injection valve and configured to perform lean combustion to burn air-fuel mixture at an air-fuel ratio that is leaner than a stoichiometric air-fuel ratio, the evaporative fuel processing device configured to cause evaporative fuel in a fuel tank to be burned in the internal combustion engine by using an adsorption unit, which is configured to adsorb evaporative fuel, and a purge control valve, which is provided in a purge passage that communicates an intake passage of the internal combustion engine with the adsorption unit, the evaporative fuel processing device comprising:

a purge control unit configured to open the purge control valve to supply, as purge gas, the evaporative fuel together with air to the intake passage, in response to a predetermined purge request;
an air-fuel ratio detection unit configured to detect an air-fuel ratio of the internal combustion engine;
a concentration learning unit configured to
estimate a fuel concentration in the purge gas based on a change in the air-fuel ratio detected by using the air-fuel ratio detection unit when the purge control unit causes the purge gas to be supplied to the intake passage and
perform a fuel concentration learning to update a concentration learning value, which is a learning value of the fuel concentration in the purge gas, based on the estimated fuel concentration;
an injection control unit configured to
correct a fuel injection amount, by which fuel is to be injected from the fuel injection valve, based on the concentration learning value in a period in which the concentration learning unit performs the fuel concentration learning in the lean combustion operation and
cause the fuel injection valve to inject fuel by the corrected fuel injection amount; and
an air-fuel ratio learning unit configured to
acquire an air-fuel ratio deviation amount, which is a deviation amount between a target air-fuel ratio of the internal combustion engine and the detected air-fuel ratio detected by using the air-fuel ratio detection unit, in a state where the purge gas is not supplied to the intake passage and
perform an air-fuel ratio learning to correct the detected air-fuel ratio, wherein
the purge control unit is configured to open the purge control valve to supply the purge gas to the intake passage, in response to the purge request in the lean combustion operation, on condition that the air-fuel ratio learning has been performed by the air-fuel ratio learning unit in the lean combustion operation, and
the concentration learning unit is configured to perform the fuel concentration learning, after the air-fuel ratio learning unit has completed the air-fuel ratio learning, and when the purge control unit supplies the purge gas to the intake passage.

2. The evaporative fuel processing device according to claim 1, wherein
the injection control unit is configured to control the fuel injection amount in a period in which the fuel concentration learning is performed, such that the detected air-fuel ratio converges to the target air-fuel ratio.

3. The evaporative fuel processing device according to claim 1, further comprising:
an operation control unit configured to switch an operating state of the internal combustion engine from a stoichiometric combustion operation to a lean combustion operation, in response to a predetermined lean combustion request in the stoichiometric combustion operation in which mixture gas is burned at a stoichiometric air-fuel ratio, wherein
the concentration learning unit is configured to perform the fuel concentration learning after the operation control unit switches the operating state of the internal combustion engine from the stoichiometric combustion operation to the lean combustion operation.

4. The evaporative fuel processing device according to claim 3, further comprising:
an injection amount learning unit configured to perform injection amount learning to correct the fuel injection amount, by which fuel is to be injected from the fuel injection valve, based on a deviation amount between a command injection amount for the fuel injection valve and an actual fuel injection amount, wherein
the operation control unit is configured to switch the operating state of the internal combustion engine from the stoichiometric combustion operation to the lean combustion operation, in response to the lean combustion request in the stoichiometric combustion operation, on condition that a learning history, in which the injection amount learning unit has performed the injection amount learning in the stoichiometric combustion operation, exists.

5. The evaporative fuel processing device according to claim 3, wherein
the operation control unit is configured to switch the operating state of the internal combustion engine from the stoichiometric combustion operation to the lean combustion operation, in response to the lean combustion request in the stoichiometric combustion operation, on condition that a learning history, in which the fuel concentration learning unit has performed the fuel concentration learning in the stoichiometric combustion operation, exists.

6. The evaporative fuel processing device according to claim 5, wherein
the operation control unit is configured to switch the operating state of the internal combustion engine from the stoichiometric combustion operation to the lean combustion operation, in response to the lean combustion request in the stoichiometric combustion operation, on condition
that a learning history, in which the concentration learning unit has performed the fuel concentration learning in the stoichiometric combustion operation, exists and
that the concentration learning value, which is updated by the fuel concentration learning in the stoichiometric combustion operation, is equal to or higher than a minimum concentration that is determined based on a minimum injection amount of the fuel injection valve.

7. The evaporative fuel processing device according to claim 1, further comprising:
an operation control unit configured to switch an operating state of the internal combustion engine from a stoichiometric combustion operation to a lean combustion operation, in response to a predetermined lean combustion request in the stoichiometric combustion operation in which mixture gas is burned at a stoichiometric air-fuel ratio;

an injection amount learning unit configured to perform injection amount learning to correct the fuel injection amount, by which fuel is to be injected from the fuel injection valve, based on a deviation amount between a command injection amount for the fuel injection valve and an actual fuel injection amount; and an air-fuel ratio learning unit configured to
- acquire an air-fuel ratio deviation amount, which is a deviation amount between a target air-fuel ratio of the internal combustion engine and the detected air-fuel ratio detected by using the air-fuel ratio detection unit, in a state where the purge gas is not supplied to the intake passage and
- perform an air-fuel ratio learning to correct the detected air-fuel ratio, wherein the operation control unit is configured to switch the operating state of the internal combustion engine from the stoichiometric combustion operation to the lean combustion operation, in response to the lean combustion request in the stoichiometric combustion operation, on condition that a learning history, in which the injection amount learning unit has performed the injection amount learning in the stoichiometric combustion operation, exists, the purge control unit is configured to open the purge control valve to supply the purge gas to the intake passage, in response to a purge request after the operation control unit has switched the operation state of the internal combustion engine from the stoichiometric combustion operation to the lean combustion operation, on condition that the air-fuel ratio learning unit has performed the air-fuel ratio learning after switching to the lean combustion operation, and the concentration learning unit is configured to perform the fuel concentration learning after the air-fuel ratio learning unit has completed the air-fuel ratio learning, and when the purge control unit supplies the purge gas to the intake passage.

8. The evaporative fuel processing device according to claim 1, wherein the concentration learning unit is configured to update the concentration learning value for a plurality of times in a period in which the fuel concentration learning is performed in the lean combustion operation, and the injection control unit is configured to correct the fuel injection amount, by which fuel is to be injected from the fuel injection valve, based on the concentration learning value, which has been updated in the period in which the fuel concentration learning is being performed, in a period in which the concentration learning unit performs the fuel concentration learning in the lean combustion operation.

9. The evaporative fuel processing device according to claim 1, wherein the purge control unit is configured to limit at least one of an amount of change in a flow rate of the purge gas to the intake passage per unit time and an upper limit of the flow rate of the purge gas to the intake passage in a period in which the concentration learning unit performs the fuel concentration learning in the lean combustion operation.

10. An evaporative fuel processing device comprising:
a computer configured to:
- open a purge control valve to communicate an adsorption unit with an intake passage of an internal combustion engine to supply, as purge gas, evaporative fuel, which is generated in a fuel tank and adsorbed in the adsorption unit, together with air to be burned in the internal combustion engine, in response to a predetermined purge request;
- detect an air-fuel ratio of the internal combustion engine;
- estimate a fuel concentration in the purge gas based on a change in the detected air-fuel ratio when the purge gas is supplied to the intake passage;
- perform a fuel concentration learning to update a concentration learning value, which is a learning value of the fuel concentration in the purge gas, based on the estimated fuel concentration;
- correct a fuel injection amount, by which fuel is to be injected from the fuel injection valve, based on the concentration learning value, in a period in which the fuel concentration learning is performed, when the internal combustion engine performs a lean combustion operation to burn air-fuel mixture at an air-fuel ratio that is leaner than a stoichiometric air-fuel ratio;
- cause the fuel injection valve to inject fuel by the corrected fuel injection amount;
- acquire an air-fuel ratio deviation amount, which is a deviation amount between a target air-fuel ratio of the internal combustion engine and the detected air-fuel ratio, in a state where the purge gas is not supplied to the intake passage;
- perform an air-fuel ratio learning to correct the detected air-fuel ratio;
- open the purge control valve to supply the purge gas to the intake passage, in response to the purge request in the lean combustion operation, on condition that the air-fuel ratio learning has been performed in the lean combustion operation; and
- perform the fuel concentration learning, after the air-fuel ratio learning is completed and when the purge control unit supplies the purge gas to the intake passage.

11. The evaporative fuel processing device according to claim 1, further comprising:

a lean combustion determination unit configured to determine whether lean combustion is performed, wherein in response to determination of the lean combustion determination unit that lean combustion is performed, the concentration learning unit is configured to perform the fuel concentration learning, and the injection control unit is configured to cause the fuel injection valve to inject fuel by the corrected fuel injection amount.

12. The evaporative fuel processing device according to claim 1, wherein the concentration learning unit is configured to estimate the fuel concentration in the purge gas based on a change in the air-fuel ratio deviation amount when the purge control unit causes the purge gas to be supplied to the intake passage.

13. The evaporative fuel processing device according to claim 1, wherein the concentration learning unit is configured to perform the fuel concentration learning for a plurality of times until the detected air-fuel ratio converges to the target air-fuel ratio.

14. The evaporative fuel processing device according to claim 10, wherein
 the computer is configured to determine whether lean combustion is performed, wherein
 in response to determination that lean combustion is performed, the fuel concentration learning is performed, and the fuel injection valve is caused to inject fuel by the corrected fuel injection amount.

15. The evaporative fuel processing device according to claim 10, wherein
 the computer is configured to estimate the fuel concentration in the purge gas based on a change in the air-fuel ratio deviation amount when the purge gas is supplied to the intake passage.

16. The evaporative fuel processing device according to claim 10, wherein
 the computer is configured to perform the fuel concentration learning for a plurality of times until the detected air-fuel ratio converges to the target air-fuel ratio.

\* \* \* \* \*